UNITED STATES PATENT OFFICE.

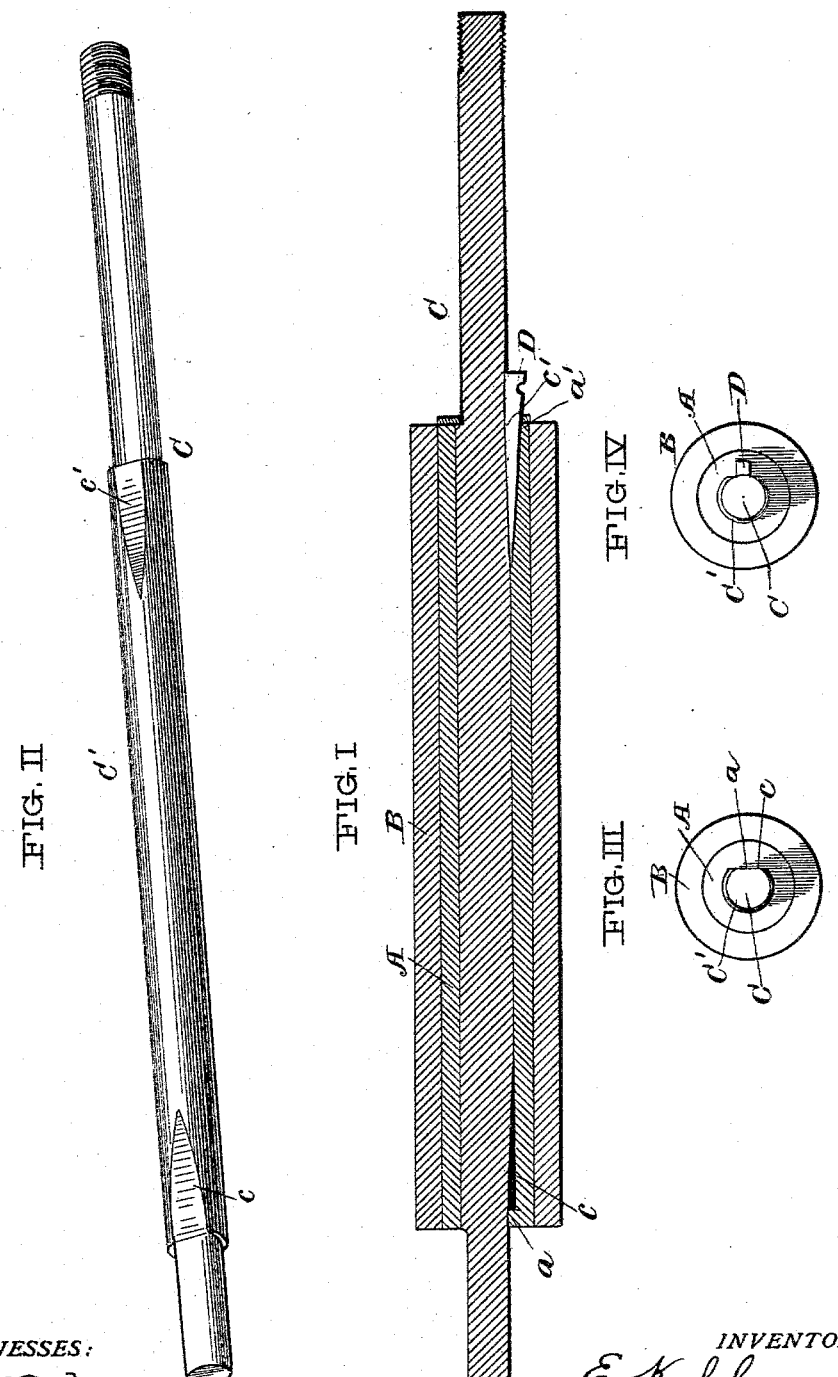

EDWARD KOHL, OF CLEVELAND, OHIO.

ROLL FOR CLOTHES-WRINGERS.

SPECIFICATION forming part of Letters Patent No. 494,814, dated April 4, 1893.

Application filed April 29, 1892. Serial No. 431,122. (No model.)

*To all whom it may concern:*

Be it known that I, EDWARD KOHL, a citizen of the United States, and a resident of Cleveland, county of Cuyahoga, and State of Ohio, have invented certain new and useful Improvements in Rolls for Clothes-Wringers, of which the following is a specification.

The principle of the invention is herein explained, and the best mode in which I have contemplated applying that principle, so as to distinguish it from other inventions.

In the accompanying drawings Figure I represents a longitudinal section of my improved wringer roll; Fig. II, a perspective view of the roll shaft, and Figs. III and IV, end views of the roll.

In the drawings the letter A indicates a metal tubular core or tube upon which a covering, B, of rubber is suitably secured by vulcanizing the rubber upon said tube or by any other suitable means. The axial bore of said core is formed at one end with an inwardly projecting segmental lip, $a$, the edge of which forms the chord of the segment formed by the lip. The other end of the bore in the core is formed with an oblique seat, $a'$, preferably in the same side of the bore as the lip and in a line therewith. The roll shaft, C, is formed with an enlarged portion, $C'$, of the same length as the roll, and the ends of said enlarged portion are formed with flat surfaces, preferably in the form of inclines, $c$ and $c'$, and preferably upon the same side of the enlargement and in a line with each other. When the shaft is inserted through the bore of the core, it fills up said bore, being of about the same external diameter as the internal diameter of the bore in the core, and the flat surface of the incline $c$ bears against the straight edge of the lip $a$, which thus forms a locking projection, preventing the shaft and roll from revolving in relation to each other. A wedge or key, D, is inserted and secured between the seat in the other end of the bore and the flat surface of the other incline, $c'$, which thus forms a key seat, and said key forms a locking projection which prevents the shaft and roll from revolving in relation to each other, and also secures the roll from longitudinal movement upon the shaft.

In a wringer roll constructed in the above described manner, the roll may be removed from the roll shaft whenever the rubber of the former is worn out, and may be replaced by a new roll, without requiring the services of an expert mechanic. The removal of one roll and securing of another roll may be done in a moment of time, as it is only necessary to knock out the key, slip the roll off from the shaft, slip another roll upon the shaft, and again secure the key.

I claim—

The combination of the roll shaft C formed with the enlarged portion $C'$ having the inclined flat surfaces $c$ and $c'$ at its ends, the wringer roll B having the tubular core A formed with the segmental lip $a$ and the key-seat $a'$, said lip and key-seat registering with the inclined surfaces $c$ and $c'$, and the key D seated in said seat $a'$ and upon said inclined surface $c'$, substantially as set forth.

In testimony that I claim the foregoing to be my invention I have hereunto set my hand this 27th day of April, A. D. 1892.

EDWARD KOHL.

Witnesses:
 J. B. FAY,
 WM. SECHER.